3 Sheets--Sheet 1.
M. V. NICHOLS.
Vehicles.
No. 6,119.
Reissued Nov. 3, 1874.
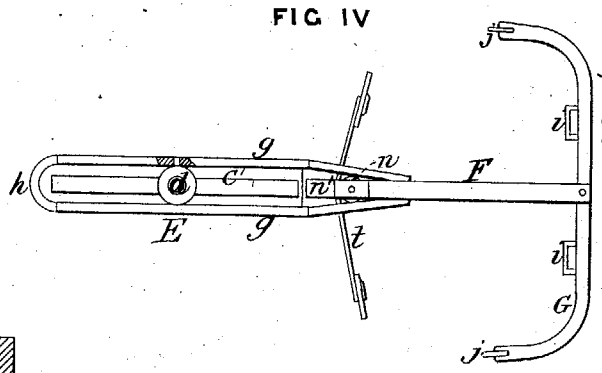
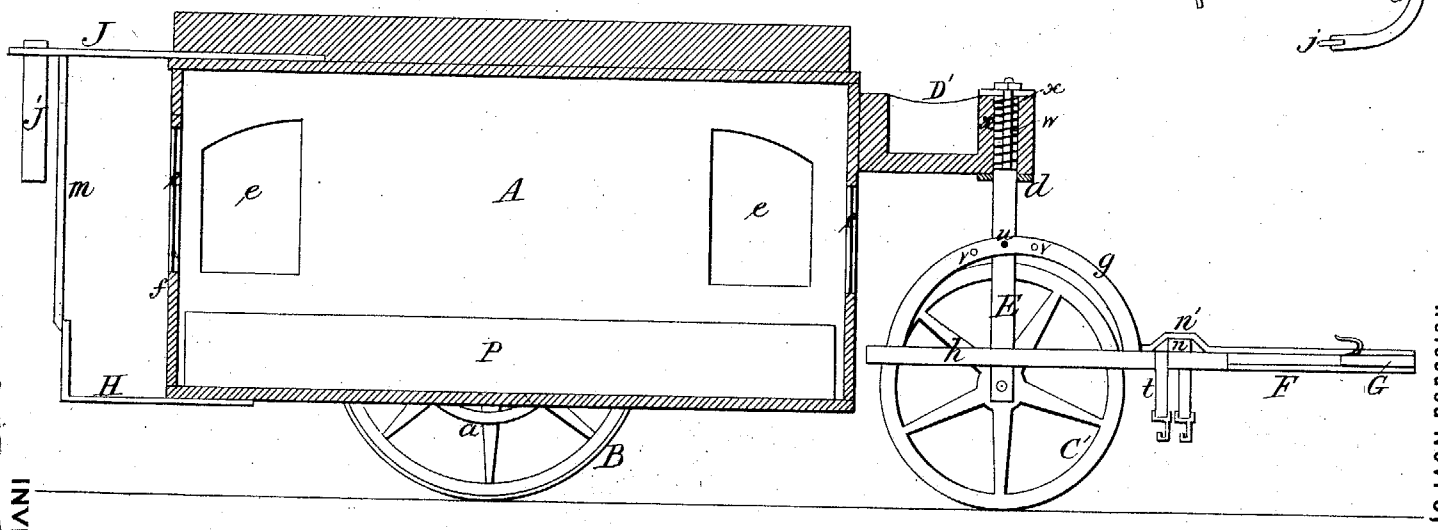
WITNESSES
John E. Laing
J. H. Rutherford
INVENTOR
Martin V. Nichols
by Johnson and Johnson
his Attorneys
THE GRAPHIC CO. PHOTO-LITH. 39 & 41 PARK PLACE, N.Y.

3 Sheets--Sheet 2.
M. V. NICHOLS.
Vehicles.
No. 6,119.
Reissued Nov. 3, 1874.
FIG II
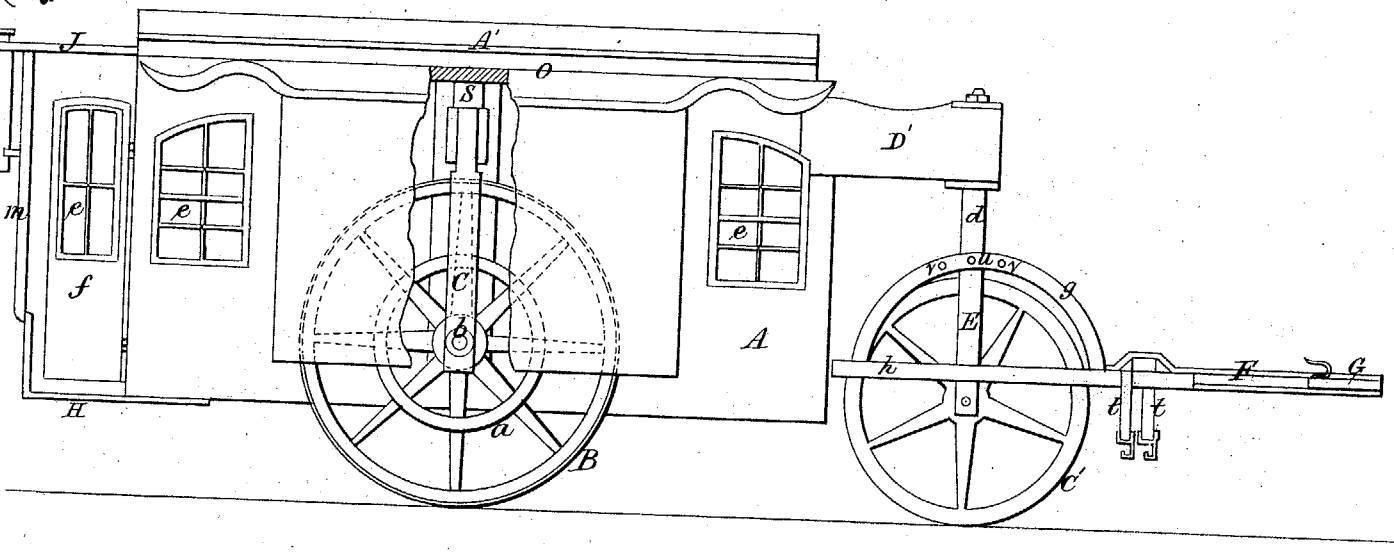
FIG V
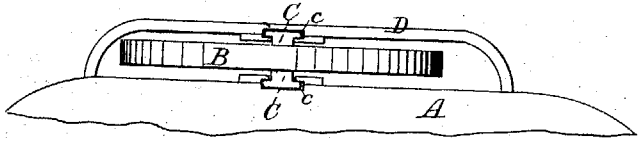
WITNESSES
John E. Laing
J. A. Rutherford
INVENTOR
Martin V. Nichols,
by Johnson and Johnson
his Attorneys.
THE GRAPHIC CO. PHOTO-LITH. 39 & 41 PARK PLACE, N.Y.

3 Sheets--Sheet 3.
M. V. NICHOLS.
Vehicles.
No. 6,119.
Reissued Nov. 3, 1874.
FIG III
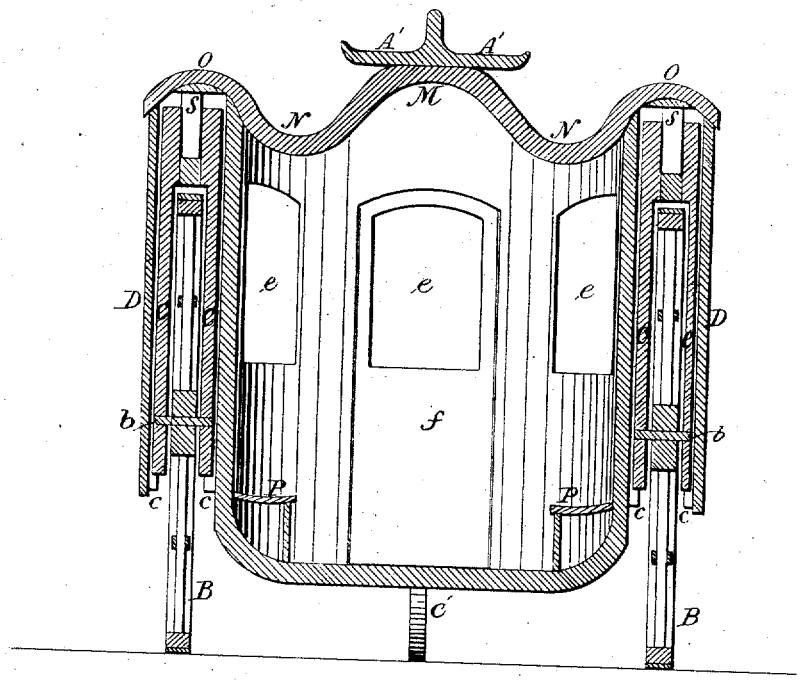
WITNESSES
John E. Laing
J. H. Rutherford
INVENTOR
Martin V. Nichols
by Johnson and Johnson
his Attorneys.
THE GRAPHIC CO. PHOTO-LITH. 39 & 41 PARK PLACE, N.Y.

UNITED STATES PATENT OFFICE.

MARTIN V. NICHOLS, OF OSAGE, IOWA.

IMPROVEMENT IN VEHICLES.

Specification forming part of Letters Patent No. 152,673, dated June 30, 1874; reissue No. 6,119, dated November 3, 1874; application filed October 20, 1874.

DIVISION A.

*To all whom it may concern:*

Be it known that I, MARTIN V. NICHOLS, of Osage, in the county of Mitchell and State of Iowa, have invented certain new and useful Improvements in Road Carriages or Omnibuses, of which the following is a specification, in connection with the accompanying drawings, in which—

Figure 1 represents a vertical longitudinal section of a road carriage or omnibus embracing my invention; Fig. 2, side view thereof; Fig. 3, a transverse section of the same; Fig. 4, a top view of the tongue, its draft attachments, and swiveling supporting-wheel; and Fig. 5 a view of one of the carriage-wheels and its frame secured within its housing.

In a patent granted to me November 11, 1873, I have described a road wagon or omnibus carried low down to the ground, to afford easy ingress and egress for passengers; and the mounting of the carriage-body upon large wheels in such manner that the supporting-points for the body, while having independent bearings upon short wheel-axles, will be above the circumference of said wheels; the object being, while obtaining an easy-going omnibus, to render it, at the same time, similar in construction to a street-car as to the accommodation of passengers. The invention claimed herein is an improvement upon that patented to me, as aforesaid; and it consists, first, in the combination, in an omnibus, of vertical movable frames, with the supporting-wheels mounted therein, and spring-seats, upon which the top of the body rests directly, with these parts vertically in line with the axes of the wheels, whereby the large wheels, their frames, and the spring-bearings for the body are rendered more compact, durable, and cheaper in construction, and the body supported by its top resting directly upon single points of spring-seats, and without hinged connections: second, in the combination of the vertical movable wheel-carrying frames, with supporting-guides therefor arranged upon the inner walls of the wheel-housings, whereby the frames and wheels are kept in place, and braced against lengthwise vibration upon its top spring-seats or single points of support; third, of the vertical movable wheel-carrying frames, interlocked with the wheel-housings by T-shaped tongue and guideway connections, for bracing the outer sides of the housings to the sides of the body by means of the wheel-frames, thereby securing the latter and the outer casing to the side walls of the omnibus; fourth, of the housing-walls for the frames and their wheels, arranged upon, and combined with, the outer sides of the body of the omnibus, to obtain increased room within the body, and lessen the expense of construction; fifth, in the combination, in an omnibus, of a front-supporting swiveling-wheel, and a draft-tongue carried thereby partially in rear of the front support, and with the wheel, between the horses, and in advance of their hips, in order to bring the horses not only near to the load, but advance the load partially in front of the haunches of the horses; sixth, in the combination, with the driver's seat of an omnibus, of the swiveling supporting-wheel, its standard, and the draft-tongue, whereby the draft-connection is, in said seat, only with the line of draft brought near the bottom of the omnibus; seventh, in the combination, with the front guide-wheel and its swiveling-standard, of the draft-tongue and the arched braces, whereby the front end of the tongue may be raised or lowered upon said wheel to suit high and low horses, and keep the body always level; eighth, in the combination, with the draft-tongue and the front supporting-wheel, placed in advance of the load, of the draft-yoke and the self-adjusting draft-strap, having a roller-bearing upon the tongue, whereby the tongue and its attachments co-operate with the front wheel-support to lessen the distance between the horses and the load, and bring the latter partially in advance of the horses; ninth, of a corrugated top, in combination with the central seats thereon, whereby side valleys are formed on each side of the seat-ridge, to afford spaces for the feet of the passengers sitting on the central seat; tenth, in the combination, with the top central seats and the side valleys, of elevations bounding said valleys, to afford foot-rests for the passengers over the wheel-housings. The body A of the omnibus is preferably constructed with rounded ends, which are provided with windows *e*, with the ingress and egress door *f* at the rear, and the platform H, supported by rods *m*, to a horizontal bracket, J, extending from the top of the body. The top of the body is corrugated longitudinally, as shown in Fig. 3, the central portion M of such corrugations being elevated to give free headway within the omnibus, and to form a ridge for double seats A′, for the accommodation of outside passengers. By corrugating the top the body is strengthened longitudinally, and two valleys, N N′, are formed on opposite sides of the seats to afford places for the feet of the passengers sitting in these seats, while the elevations O outside of the valleys afford footrests over the wheel-housings, with the valleys immediately over the interior seats P, and, therefore, on each side of the central standing room, and, in this particular, affording convenience to persons entering and leaving. The omnibus is supported upon two side wheels, B B, and a front swiveling-wheel, C′, combined with the draft-tongue F, and the driver's seat D′, in a manner and for a purpose to be presently described. The wheels B B I construct about seven feet in diameter, and the front wheel about six feet, with the body carried low down thereon, to obtain the advantage of an easily-rolling movement over the inequalities in the road. These large wheels are suitably braced and strengthened by one or more circular braces, *a*, secured to the spokes between the fellies and the hub, whereby they may be made comparatively light. The journals *b* of these wheels coincide with each other, and are made short. These short journals turn in boxes in the lower ends of vertical movable frames C C, arranged transversely in wheel-housings, and with their upper ends strongly connected together, and provided with springs *s*, on the single points of which the body A of the vehicle is suspended, and allowed free vertical play, the springs forming seats upon which the top of the body rests by direct contact. The lower portions of the wheel-standards C are T-shaped in their cross-section, as shown in Fig. 5, and are fitted with correspondingly-shaped guide-ways *c c*, which are, respectively, formed on the outer sides of the body A, and the inner sides of pockets D, which inclose or house in the wheel-frames C outside of the body, so as not to interfere with the interior seat-space, and to cheapen the construction. The frames C move freely in their guideways vertically, and allow the body A to play freely on the springs *s*, which, by my improved construction, affords supports or suspension-bearings for the body A directly above the axis of the transporting-wheels B B, whereby the body is allowed slight side rocking movement with the vertical play, and is firmly sustained and braced from longitudinal vibration, while the tongued frames, interlocking with the T-shaped guideways *c*, secure the housings D to the sides of the body, and holds the wheel securely in its guides. The driver's seat D′ extends out from the front of the body A, and receives vertically through its front end the spindle or journal *d* of a forked standard, E, between the forks of which the front supporting-wheel C′ is mounted. To the spindle portion *d* of the standard E I secure the draft-tongue F, by means of arched braces *g*, made adjustable upon the connecting-bolt *u* by holes *v* in the braces, in order to raise and lower the end of the tongue to suit different-sized horses, and thereby maintain the level of the vehicle-body. The rear portion *h* of the draft-tongue is yoked or open to receive the swiveling-wheel. A spring, *w*, is arranged in the socket-bearing *x* of the driver's seat, so that the wheel-standard, having its bearing in said seat, is free to swivel, and have vertical play therein.

In wheeled vehicles hitherto constructed, the point of the draft-attachment is wholly in the rear of the horses, throwing them some distance forward of the front supporting-wheels of the vehicle. By the combination with the swiveling-wheel of the tongue-draft attachments, I am enabled to lessen the distance between the horses and the load, and effect a more compact draft-arrangement and facilities for turning. By the combination stated, the point of the draft-attachment is still in front of the forward wheel; but the horses are placed back of their usual relative position to the load, and the front support for the omnibus brought forward between the horses, and in advance of their hips. This bringing the load partially in advance of the horses' hips, is effected by the draft-yoke G in front, and self-adjusting draft-strap *t*, passing round a roller, *n*, or the tongue F, and to which the inside tugs are attached, while the outside tugs are secured to the curved ends *j* of the draft-yoke, making the arrangement compact, and placing the horses to draw and turn beneath the load, so as to more easily handle the omnibus.

If it is desired to use a number of springs at the upper ends of the wheel-carrying frames C C, this may be conveniently done by rigidly securing cross-bars to the upper ends of these frames, and connecting the ends of the bars to rubber or other springs. The upper ends of the springs will have a bearing against a bar which is rigidly secured to the body of the vehicle. I am thus able to use a series of springs for each frame, and to have these springs of greater length.

I claim—

1. The combination, in an omnibus, of vertical movable frames C C, with the supporting-wheels B B, and the spring-seats *s s*, on which the top of the body rests directly at points vertically in line with the axes of the wheels, substantially as and for the purpose set forth.

2. The combination, with the vertical movable wheel-carrying frames C C, of the supporting-guides *c c*, upon the inner walls of the wheel-housings D, substantially as and for the purpose set forth.

3. The vertical movable wheel-carrying frames C C, provided with T-shaped tongues, in combination with the interlocking guide-ways *c c*, whereby the outer sides of the housings D are braced to the sides of the body, as set forth.

4. The housing-walls D, for the wheels, in combination with the outer sides of the body from which they project, as and for the purpose set forth.

5. The combination, in an omnibus, of a front-supporting swiveling-wheel, C′, and a draft-tongue, F, carried thereby partially in rear of the front support, substantially as and for the purpose set forth.

6. The combination, with the seat D′, of a single swiveling supporting-wheel, C′, its standard E, and the draft-tongue F, whereby the draft-connection is from the elevated seat D′, with the line of draft brought near the bottom of the body, as described.

7. The combination, with the front guide-wheel C′ and its swiveling standard E, of the draft-tongue F and the arched braces *g*, substantially as and for the purpose described.

8. The combination, with the draft-tongue F and the front supporting-wheel C′, of the draft-yoke G, and the self-adjusting draft-strap *t*, having a roller-bearing, *n*, upon the tongue, whereby the tongue and its attachments co-operate with the front wheel, substantially as and for the purpose set forth.

9. The corrugated top, in combination with the central seats A′ thereon, and the side valleys N N′ formed on each side of the seat-ridge M, as and for the purpose set forth.

10. The combination, with the top central seats A′ and the side valleys N N′, of the elevations O O, bounding said valleys, to afford foot-rests over the wheel-housings, as set forth.

In testimony whereof I have hereunto set my hand this 1st day of October, A. D. 1874.

MARTIN V. NICHOLS.

Witnesses:

A. E. H. JOHNSON,

J. W. HAMILTON JOHNSON.